Aug. 6, 1968  F. F. RUBIN  3,395,709
METHOD AND MEANS FOR CARTILAGE RESHAPING
Filed Jan. 3, 1966  2 Sheets-Sheet 1
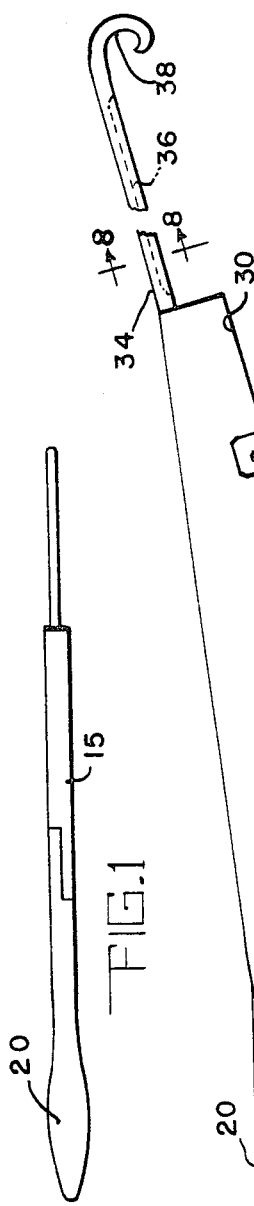
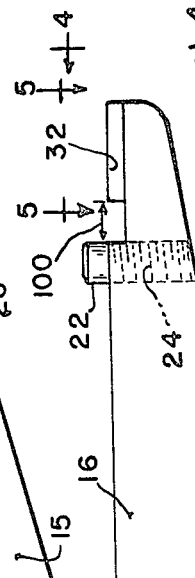
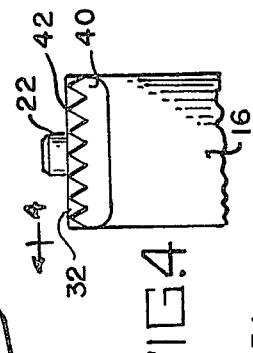
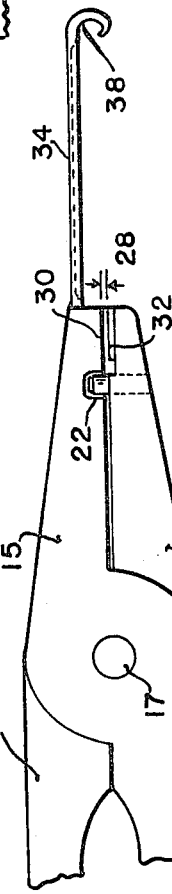
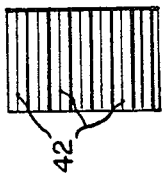
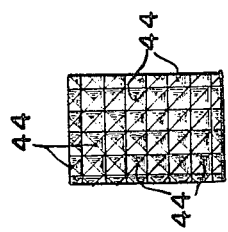
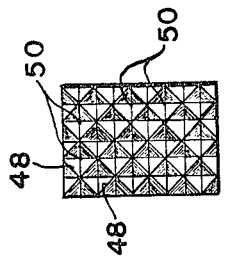
INVENTOR.
FRANK F. RUBIN
BY Walter J. Kreske
ATTORNEY Aug. 6, 1968  F. F. RUBIN  3,395,709
METHOD AND MEANS FOR CARTILAGE RESHAPING
Filed Jan. 3, 1966  2 Sheets-Sheet 2
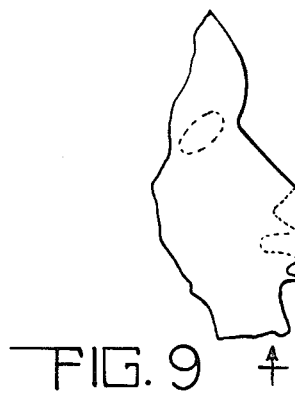
FIG. 9
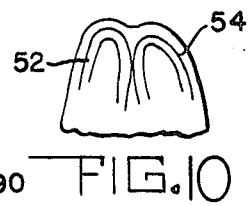
FIG. 10
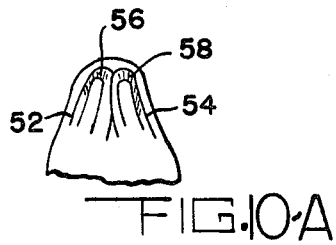
FIG. 10-A
FIG. 11
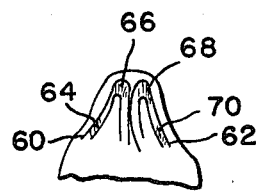
FIG. 11-A
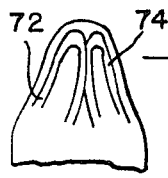
FIG. 12
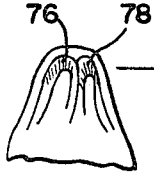
FIG. 12-A
FIG. 13
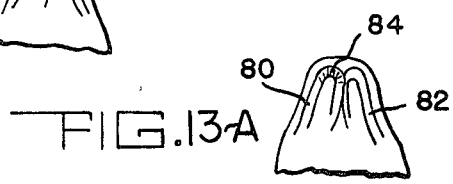
FIG. 13-A
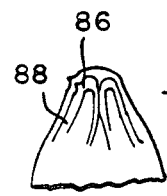
FIG. 14
FIG. 14-A
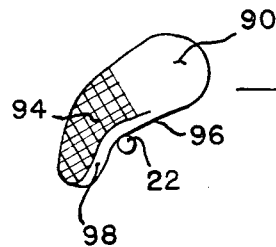
FIG. 15
INVENTOR.
FRANK F. RUBIN
BY Walter J. Kreske
ATTORNEY United States Patent Office 3,395,709
Patented Aug. 6, 1968

3,395,709
METHOD AND MEANS FOR CARTILAGE RESHAPING
Frank F. Rubin, 131 Monroe Road, Quincy, Mass. 02169
Filed Jan. 3, 1966, Ser. No. 518,157
12 Claims. (Cl. 128—305)

This invention relates to surgical reshaping of cartilaginous members of the human body, such as the cartilaginous portions of the human nose and more particularly to an improved method and apparatus for reshaping selected portions of cartilaginous members by a controlled mastication thereof.

The external shape and appearance of the lower one third of the human nose derives in large measure from its semirigid cartilaginous members such as the septum, alar and upper lateral cartilages, mesial and lateral crus. Surgical reshaping of the cartilaginous portions of the nose, whether to correct for birth defects, accidental disfiguration or merely to beautify appearance, has heretofore been impeded to some extent by the inherent resilience of the cartilaginous members with a tendency to return to their original shape, making them difficult to reshape.

In an effect to overcome this difficulty, a procedure heretofore used has been that of making a plurality of incisions or closely spaced slits nearly through a cartilage to reduce its resistance to reshaping and/or removing two thirds of the cephalic crus. However, the delicate nature of this work with its difficulty of making uniform incisions without completely severing the cartilage provide a practical limitation to this procedure. Also, a further limitation of such incisions is that as the cartilage heals it tends to return in large measure to its original shape, thereby partially or entirely counteracting the desired reshaping operation.

These problems and difficulties have been overcome by the present invention which also incorporates other desirable features and advantages. Among the other desirable features and advantages of the present invention is that of simplifying the surgical procedure in reshaping the cartilaginous portions of the nose. Another desirable feature and advantage is the ready adaptability of the invention to different cartilage thicknesses. A further desirable feature and advantage is the accuracy with which it can be applied to selected cartilaginous areas. Other desirable features and advantages include relative simplicity, ruggedness and inexpensiveness of instrument structure, as well as a high degree of manual control, convenience and efficiency achieved therewith in a cartilage reshaping operation.

A primary object of the present invention is the provision of an apparatus for masticating a selected portion of a cartilage in manner to reduce its resilience and impart a soft readily moldable characteristic to the cartilage.

Another object is the provision of an apparatus for performing a controlled masticating operation on a cartilage which effects a desired balance between plastic flow and shape retention capabilities for effective reshaping of the member.

A further object is the provision of an apparatus for controlled mastication of only one side of a cartilage to a selected depth sufficient to permit permanent reshaping of the cartilage with the unmasticated side providing a flexible base and continuity of fiber for facilitating the reshaping operation followed by healing in conformance with the newly formed shape.

And another object is the provision of an apparatus which is adjustable to accommodate different cartilage thicknesses as well as different amounts of mastication and depth of mastication for varying degrees of reshaping desired.

And a still further object is the provision of an improved method for reshaping the cartilaginous portions of the human nose.

These and other objects, features and advantages are achieved generally by the provision of a pair of jaws with one jaw having a substantially smooth surface and the other jaw having a plurality of masticating members projecting therefrom in the direction of the smooth surface, a structure for pressurably moving the jaws toward each other, and a stop for limiting the movement of the jaws to a preselected distance therebetween.

By providing a fulcrum at one end of the jaws and extending said ends to form levers and handles, a convenient and versatile manually operable, unitary masticating instrument is thereby achieved.

By making said stop in the form of a projection on the masticating jaw at a preselected distance from said masticating members, it thereby also provides a stop for the periphery of the cartilage, desirably leaving an unmasticated rim equal in width to said preselected distance.

By making said stop height adjustable with respect to the masticating jaw, adaptability for different cartilage thicknesses and degrees of rigidity of the masticated cartilage is thereby achieved.

By providing a grooved director extension from the other end of the smooth jaw, a convenient, versatile and efficient combination for exposing, trimming and softening a cartilage such as the lateral crus is thereby achieved.

These and other features, objects and advantages of the invention will be better understood from the following description taken in connection with the accompanying drawings of a preferred embodiment of the invention wherein:

FIG. 1 is a top view of a combined cartilage masticating tool and grooved director in accordance with the present invention.

FIG. 2 is an enlarged scale side view of a portion of the preferred embodiment illustrated in FIG. 1 with the jaws in closed position;

FIG. 3 is a side view of the FIG. 1 embodiment shown in further enlarged scale with the jaws in the open position;

FIG. 4 is an end view of a portion of the masticating jaw taken on line 4—4 of FIG. 3 to illustrate parallel row structure of cartilage masticating members;

FIG. 5 is a top view of the masticating members taken on line 5—5 of the FIG. 3 illustration to more clearly show the parallel row structure in one form of the masticating members;

FIG. 6 is a top view taken on line 5—5 of FIG. 3 illustrating an alternative type of cartilage masticating structure;

FIG. 7 is a top view taken on line 5—5 of FIG. 3 illustrating another alternative type of cartilage masticating structure;

FIG. 8 is a view taken on line 8—8 of FIG. 3 to more clearly show cross sectional structure of the grooved director;

FIG. 9 is a side view a portion of a human head showing a human nose in profile with some of the cartilaginous structure therein for illustrating the improved method of the present invention;

FIG. 10 is a bottom view taken on line 10—10 of FIG. 9 schematically illustrating a broad tip nose;

FIG. 10-A is a schematic illustration of the FIG. 10 broad tip nose reformed in accordance with the present invention;

FIG. 11 is a bottom view taken on line 11 of FIG. 10 schematically illustrating a circular contour nose;

FIG. 11-A is an illustration of the FIG. 11 nose reformed in accordance with the present invention;

FIG. 12 is a bottom view taken on line 12—12 of FIG. 10 schematically illustrating an extraordinarily long pointed nose;

FIG. 12-A is an illustration of the FIG. 12 nose reformed in accordance with the present invention;

FIG. 13 is a bottom view taken on line 13—13 of FIG. 10 schematically illustrating an asymmetrically tipped nose resulting from one half lobe projecting more than the other half;

FIG. 13-A is an illustration of the FIG. 13 nose reformed in accordance with the present invention;

FIG. 14 is a bottom view taken on line 14—14 of FIG. 10 schematically illustrating a nose with spicules or irregularities in the cartilage;

FIG. 14-A is an illustration of the FIG. 14 nose reformed to correct the irregularities in accordance with the present invention;

FIG. 15 is an illustration of a cartilage having a portion thereof masticated in accordance with the present invention.

Referring to FIGS. 1, 2 and 3 in more detail the combined cartilage masticator and grooved director surgical instrument therein shown has a pair of narrow, elongated jaws 15 and 16 respectively in opposed relation to each other. One end of each of the jaws 15 and 16 is mounted to swing on a pivot 17 and have handle extensions 18 and 20 respectively providing hand operable levers to pressurably move or swing the jaws 15 and 16 toward each other to a closed position shown in FIG. 2 from an open position shown in FIG. 3. A stop member 22 having a threaded body portion screwed into the jaw 16 aligned with a recess 26 limits the movement of the moveable jaws 15 and 16 toward each other, preferably leaving, when in the closed position, a small clearance space 28 between the inner smooth surface 30 of the jaw 15 and a serrated cartilage masticating surface 32 which may have alternative configurations shown in FIGS. 4, 5, 6 and 7 as will be hereinafter further described.

Extending from the end of the jaw 15 opposite the handle 18 is a hook shaped member 34. The hook shaped member 34 preferably carries in the underside thereof a V-cross sectional shaped groove 36 providing a blade guide for surgical tirmming operations. The member 34 with its hook 38 and blade guide groove 36 is known generally as a conventional grooved director which when incorporated in the present instrument provides an additional feature and convenience in the overall combination as will be hereinafter further described. However, in some instances the present instrument may desirably be constructed without a grooved director.

The combined cartilage masticator and grooved director shown in FIGS. 1, 2 and 3 is preferably made in its entirety of such material as stainless steel as a unitary structure.

The serrated cartilage masticating surface 32 at the end of the masticating jaw 16 opposite the handle 20 may have several alternative masticating structures depending upon the degree of mastication desired for a particular cartilage molding operation. One of the alternative masticating structures is that of a plurality of parallel V-cross sectionally shaped grooves shown in FIGS. 4 and 5 wherein each member has a broad base 40 terminating in a sharp apex 42 running longitudinally of the elongated jaw 16.

Another alternative construction is that carrying additional V-shaped grooves running perpendicular to the apex lines 42 forming thereby pyramids with each pyramid having a sharp pointed apex 44 as shown in FIG. 7. A further alternative is that of having the V-shaped grooves of the type shown in FIG. 7 except in that they run in transverse direction to the longitudinal jaw 16 so as to form transverse grooves 46 and 48, again forming pyramids having sharp apexes 50 with sides in transverse relation to the sides of the pyramids of FIG. 7.

In the operation of the present invention it has been found that cartilages, particularly of the nose, when suitably masticated by the masticating surface 32 lose their rigidity and become softened to a mush-like fibrous structure which may be molded into desired smooth surfaced shapes and then upon healing permanently retain the new shape. For example, in FIG. 10 an excessively broad nose shaped by cartilages 52 and 54 may be reshaped into a conventional pear shaped nose shown in FIG. 10-A by exposing the cartilages 52 and 54 through an incision at the rim of the nose and masticating them at the cross-hatched areas 56 and 58 respectively. Such mastication thereby permits manual reshaping of the cartilages and thus the nose to the narrower conventional pear shaped cross sectional appearance shown in FIG. 10-A.

In similar manner, an overly circular contour of FIG. 11 carrying cartilages 60 and 62 respectively may be reformed into a conventional pear shaped cross sectional appearance by masticating them at rates 64, 66, 68 and 70 respectively to a soft condition and manually reshaping to that shown in FIG. 11-A.

This technique also lends itself to a substantial shortening of an overly projecting tip such as in FIG. 12 wherein the cartilages 72 and 74 may be exposed and their end portions 76 and 78 masticated to a softened mush condition permitting manual remolding to the shortened cross sectional appearance of FIG. 12-A. It should be noted here that such shortening operation is very difficult to accomplish except by applicant's masticating method and in which the cephalic portion 91 (FIG. 9) of the lateral crus is usually excised with the remaining portion masticated and reshaped to the shortened normal configuration of FIG. 12-A.

Deformed noses such as that appearing in FIG. 13 wherein asymmetrical cartilages 80 and 82 present an asymmetrical nose tip may be corrected in symmetry by masticating the protruding cartilage 80 at its tip 84 to a soft condition and remolding to the symmetrical cross sectional appearance shown in FIG. 13-A.

In this manner, even spicules or irregularities such as 86 appearing in a nose cartilage 88 may be corrected by exposing the cartilage 88 and masticating the deformed portion 86 to a softened condition and manually reshaping to smooth away the spicule 86 as shown in FIG. 14-A.

The grooved director 34 being integral with the masticating instrument provides a particularly convenient structure for expediting the above operations described by facilitating exposure of the desired cartilage. For example, to expose the greater alar cartilage 90 for reshaping, an incision may be made at the lower extremity or rim 92 at the nostril 93 of the nose in FIG. 9 and the cartilage freed with scissors from the nasal skin, whereupon the hook 38 of the grooved director 34 may be used to bring the cartilage 90 down through the incision. In this exposed position it may then be suitably masticated in a desired area 94 (FIG. 15) with the masticating surface 32. This is accomplished by inserting the cartilage 90 between the jaws 15 and 16 with the cartilage edge 96 against the stop 22 as a guide. The jaws 15 and 16 are then brought pressurably together to the closed position shown in FIG. 2 so that the masticating surface 32 forms the masticated area 94 with an unmasticated edge 98 of width 100 (FIG. 3) found empirically to provide just enough firmness as a reshaping base. It has been found that a width 100 equal to one millimeter usually provides about the proper amount of firmness. The clearance 28 (FIG. 2) and smooth surface 30 of the jaw 15 insure an intact vestibular wall at the underside of the cartilage 90. In this manner, the degree of softness of the masticated area 94 may be varied by varying the number of repetitive compressions or closures of the jaws 15 and 16 as well as the type of masticating surface 32 used, the depth of mastication set by the clearance 28 and the pressure applied. The masticating surfaces shown in FIGS. 6 and 7 would tend to produce a greater breakdown and thereby a greater softening of the resulting cartilage area 94 over that which would be created by the parallel masticating structure of FIG. 5. If just a small amount or gentle flow in reshaping is desired, the FIG. 5 type of masticating surface is preferably used and at right angles to the direction of reshaping curvature. On the other hand, if a completely limp mushy condition is desired for maximum reshaping, the masticating surfaces shown in FIGS. 6 and 7 would be used.

Thus, it is seen that the combination of the clearance 100 permitting a firm rim 98 for some cases, as well as the closure clearance 28 permitting a controlled wall thickness, together with the type of masticating surface configuration 32 and applied pressure provide a wide range of possible flow and molding characteristics and firmness of understructure for suitably handling a wide range of cartilage reshaping needs.

In some instances it may be desirable to leave no unmasticated rim 98 in which event this may easily be done by not inserting the cartilage 90 as far as the stop 22.

Also, it should be noted that the jaws 15 and 16 with their ends 30 and 32 respectively may be altered in shape to suit the need for a particular cartilage. Thus, they can be made thinner, narrower or longer and with or without the grooved director 34. For example, when used in correcting the cartilaginous septum, the grooved director would be eliminated and the jaws 15 and 16 further elongated. Such alterations would also be applicable to the instrument when used for correcting such other cartilaginous members as those found at the ear.

This invention is not limited to the particular details of construction and operation herein described as equivalents will suggest themselves to those skilled in the art.

What I claim is:

1. In an intrument for mechanically softening cartilage members for physical reshaping, the combination of a pair of jaws with one jaw having a substantially smooth surface and the other jaw having a plurality of masticating members projecting therefrom in the direction of the smooth surface, stop means associated with said jaws for limiting movement of said masticating jaw toward said smooth jaw, and means coupled to said jaws for pressurably moving said jaws toward each other.

2. The combination as in claim 1 wherein said masticating members have tapered body portions fixed to said masticating jaw with each body portion terminating in a sharp apex.

3. The combination as in claim 1 wherein said masticating members are in parallel rows with the cross section configuration of each row being in the form approximating a V and having the apex of said V nearest said smooth surface.

4. The combination as in claim 1 wherein the masticating members are in substantially the form of pyramids, each having a base fixed to the masticating jaw and an apex directed at the smooth surface of said other jaw.

5. The combination as in claim 1 wherein said jaws have a length and a width dimensions with the length dimension having two ends and said means for moving said jaws includes at one of said ends of each of said jaws a pivotal mounting for swinging the jaws toward and away from each other about said pivotal mounting, a handle extending from said pivotal end of each of said jaws providing levers for pressurably moving said jaws toward each other.

6. The combination as in claim 1 wherein said jaws have a length and a width dimensions, the length dimension having two ends with said means for moving said jaws including at one of said ends of each jaw a pivotal mounting for swinging the jaws toward and away from each other about said pivotal mounting, a handle extending from said pivotal end of each of said jaws providing levers for pressurably moving said jaws toward each other, and said stop means being in the form of a projection above said masticating jaw at a position distal from said masticating members of said pivotal end of said masticating jaw.

7. The combination as in claim 1 wherein said jaws have a length and a width dimensions, the length dimension having two ends with said means for moving said jaws including at one of the ends of each of said jaws a pivotal mounting for swinging the jaws toward and away from each other about said pivotal mounting, a handle extending from said pivotal end of each of said jaws providing levers for pressurably moving said jaws toward each other, and said stop means being in the form of a projection above said masticating jaw at a position distal from the masticating members at said pivotal end and having an elongated body threadably carried in said other jaw providing capacity for adjusting the limit of travel of said maticating jaw toward said smooth jaw.

8. The combination as in claim 5 wherein an elongated hook shaped member carrying a blade guiding groove extends from the other end of said smooth jaw.

9. The method of reshaping a human nose comprising the steps of masticating the nose cartilage in the area of desired reshaping to a moldable softened condition, manually forming said softened cartilage to the desired new shape, and supporting said reformed cartilage in said new shape until it has healed.

10. The method as in claim 9 wherein said masticating is performed on only one side of said cartilage to a depth such that a thin unmasticated layer remains on the opposite side of said cartilage.

11. The method as in claim 10 wherein the masticating is performed with tapered teeth on said one side against a smooth support surface on said opposite side of said cartilage.

12. The method as in claim 11 wherein said tapered teeth are in the form of channels substantially perpendicular to the direction of reforming of said cartilage.

References Cited

UNITED STATES PATENTS

| | | | |
|---|---|---|---|
| 1,141,592 | 6/1915 | Ullich | 128—76 |
| 1,833,365 | 11/1931 | Lamke | 128—329 |
| 2,555,133 | 5/1951 | Horstmann | 128—329 |
| 2,679,249 | 5/1954 | Weihmann | 128—305 |
| 2,689,561 | 9/1954 | Posnack et al. | 128—76 |

L. W. TRAPP, *Primary Examiner.*